(12) United States Patent
Bond

(10) Patent No.: US 11,435,880 B1
(45) Date of Patent: Sep. 6, 2022

(54) USER INTERFACES FOR DISPLAYING DISCRETIZED ELEMENTS OF LOGICAL FLOW SYSTEMS

(71) Applicant: Palantir Technologies Inc., Palo Alto, CA (US)

(72) Inventor: Ethan Bond, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 125 days.

(21) Appl. No.: 16/239,956

(22) Filed: Jan. 4, 2019

Related U.S. Application Data

(60) Provisional application No. 62/729,625, filed on Sep. 11, 2018.

(51) Int. Cl.
*G06F 3/0484* (2022.01)
*G06F 3/0481* (2022.01)
*G06F 16/2457* (2019.01)
*G06F 16/25* (2019.01)

(52) U.S. Cl.
CPC .......... *G06F 3/0484* (2013.01); *G06F 3/0481* (2013.01); *G06F 16/24578* (2019.01); *G06F 16/252* (2019.01)

(58) Field of Classification Search
CPC .... G06F 3/0484; G06F 16/252; G06F 3/0481; G06F 16/24578
See application file for complete search history.

(56) References Cited

U.S. PATENT DOCUMENTS

| | | | | |
|---|---|---|---|---|
| 6,952,208 | B1* | 10/2005 | Arquie | G06T 11/206 345/440 |
| 7,580,956 | B1* | 8/2009 | Xin | G06F 16/10 |
| 2001/0045960 | A1* | 11/2001 | Keeley | G06F 40/166 345/637 |
| 2002/0133584 | A1* | 9/2002 | Greuel | H04L 41/5009 709/224 |
| 2012/0004743 | A1* | 1/2012 | Anne | G05B 19/409 700/83 |
| 2012/0317491 | A1* | 12/2012 | Wong | H04L 41/22 715/736 |
| 2015/0363702 | A1* | 12/2015 | Baum | G06N 5/048 706/52 |
| 2016/0285675 | A1* | 9/2016 | Aggarwal | H04L 41/145 |
| 2017/0201428 | A1* | 7/2017 | Normandin | G06F 7/08 |
| 2017/0331851 | A1* | 11/2017 | Pinney Wood | G06F 21/577 |
| 2018/0321977 | A1* | 11/2018 | Moore | G06F 9/5027 |

* cited by examiner

*Primary Examiner* — Daniel W Parcher
(74) *Attorney, Agent, or Firm* — Knobbe, Martens, Olson & Bear, LLP

(57) ABSTRACT

The systems and methods described herein provide highly dynamic and interactive data analysis user interfaces which enable the data analyst to quickly and efficiently explore large volume data sources, such as computer code or intellectual system. A user interface can be implanted that includes a plurality of nodes associated with portions of a process. The nodes may include indications of logical relationships between nodes. Node identifiers may be associated with particular nodes and be usable to select particular nodes. Reliability scores associated with particular nodes can be included.

20 Claims, 6 Drawing Sheets

USER INTERFACES FOR DISPLAYING DISCRETIZED ELEMENTS OF LOGICAL FLOW SYSTEMS

CROSS-REFERENCE TO RELATED APPLICATIONS

This application claims the benefit of priority under 35 U.S.C. § 119(e) to U.S. Provisional Application No. 62/729,625, filed on Sep. 11, 2018, titled "USER INTERFACES FOR DISPLAYING DISCRETIZED ELEMENTS OF LOGICAL FLOW SYSTEMS," which is hereby incorporated by reference herein in its entirety for all purposes.

BACKGROUND

Field

The present disclosure relates generally to systems and methods for graphical user interfaces and more particularly to displaying discretized logical elements.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modern scientific research requires substantial reliance on large amounts of data. Moreover, at the cutting edge of scientific advances, increasing specialization in a particular discipline is often required. Accordingly, overlap of expertise among subject-matter experts is shrinking and gaps of expertise is growing among subject-matter experts. These gaps in subject matter expertise among scientists necessitate some level of trust in the proposed findings. To reduce a reliance on trust, the scientific community calls on subject-matter peers to review and confirm at least some likelihood of accuracy in the proposed findings. However, as subject matter specialization increases, peer review of scientific findings requires more time to confirm the likelihood of accuracy. This requirement slows the dissemination of newly discovered scientific knowledge to the public.

Relatedly, software algorithms are generally comprised of a plurality of commands, logic modules, discrete applications, and/or other software elements that may seek to work together to achieve a particular function. However, debugging these individual elements can be likened to finding a needle in a haystack. For example, structural software elements may rely on one or more foundational elements. In such circumstances, identifying whether the bug exists in the foundational or structural elements may be challenging to humans or computer algorithms. User interfaces could be improved to help a user visualize a structure of a computer program and to systematically interact with the program to discover bugs and other weaknesses in the program.

SUMMARY

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

DETAILED DESCRIPTION

Overview

Figure 1:
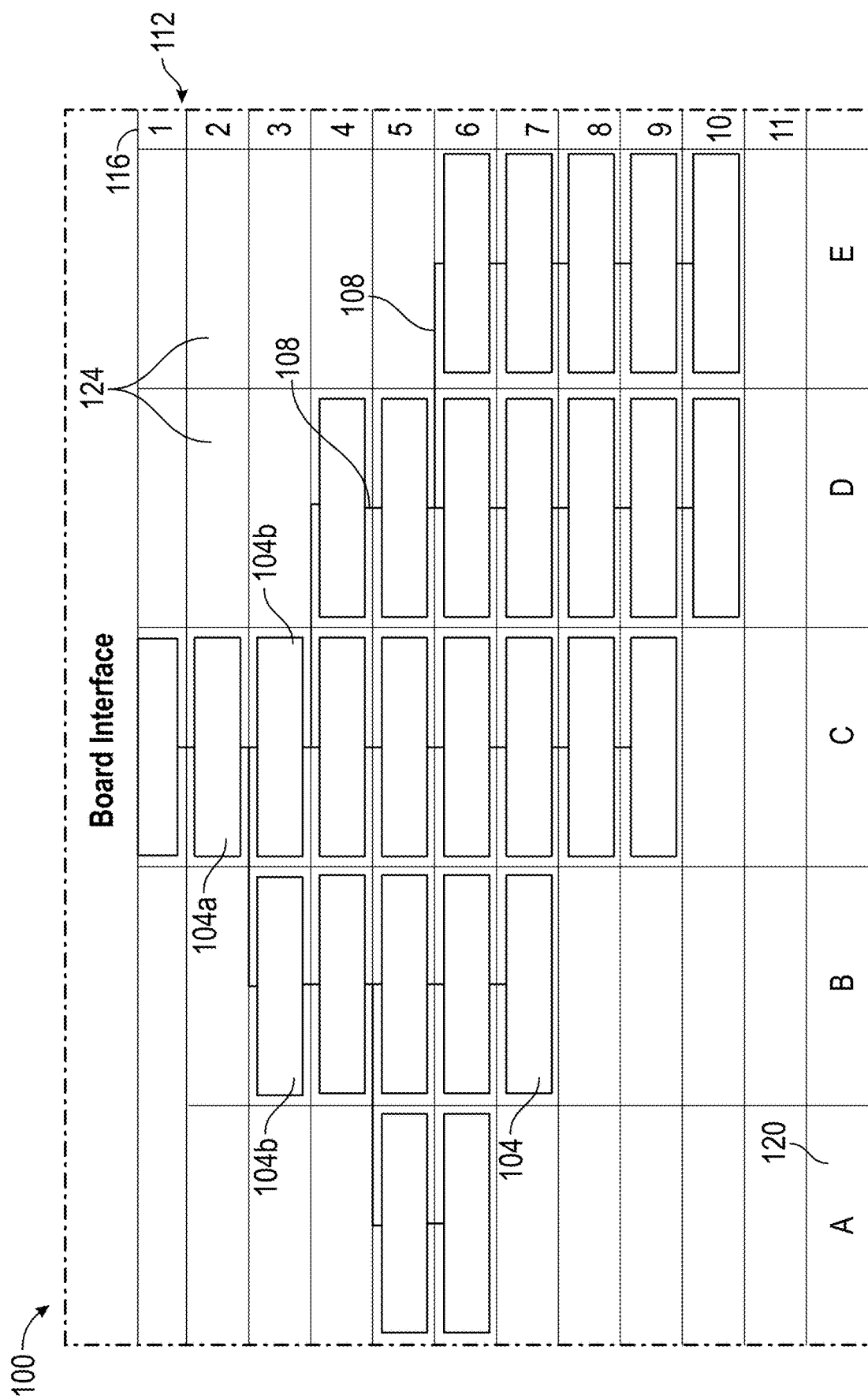
FIG. 1 illustrates an example interactive graphical user interface, as generated using one embodiment of the computer system of FIG. 6.

Data analysts face a daunting challenge when tasked with exploring a large volume of data to identify discrete pieces of information and intelligence—a veritable needle-in-a-haystack problem. In some cases, a data analyst may have a lead on something she wishes to investigate. For example, knowing that a particular bad actor was involved in an incident may be a starting point from which the data analyst can begin to investigate other individuals who may have been involved. However, in many cases the data analyst has little information or, at best, only some contextual information on which to base an investigation. For example, the data analyst might know that a website was hacked at a certain time but have little else to go on to identify the individuals involved. However, data analysts might need to explore multiple analysis paths, many of which lead to "dead ends" or results that do not answer the search premise, by sorting and filtering through a massive volume of (for example) Internet proxy traffic data, cyber security data, telephone data, and/or any other type of data. The data analyst's path through the data is often multi-directional, in that the analyst may approach a problem from the top-down, bottom-up, and/or in either direction over the course of a given data analysis path and investigation. For example, the data analyst may begin with a large set of data, submit one or more queries which may lead to smaller sets of data results or filtered data results, and then merge or join smaller sets of data results to formulate larger sets of data, exclude subsets of data, and so on in as many iterations as the data analysts desires or finds useful.

Such challenges can be particularly present in the fields of scientific inquiry or software development. Other systems involving dependencies in processes can also benefit. For example, scientific inquiry often involves substantial reliance on large amounts of data. At the cutting edge of scientific advances, increasing specialization in a particular discipline is often required. Accordingly, overlap of expertise among subject-matter experts is shrinking and gaps of expertise is growing among subject-matter experts. These gaps in subject matter expertise among scientists necessitate some level of trust in the others' proposed findings. To provide additional trust, the scientific community calls on subject-matter peers to review and confirm at least some likelihood of accuracy in the proposed findings. However, as subject matter specialization increases, peer review of scientific findings requires more time to confirm the likelihood of accuracy. This requirement slows the dissemination of newly discovered scientific knowledge to the public.

As another example, software algorithms are generally comprised of a plurality of commands, logic modules, discrete applications, and/or other software elements that may seek to work together to achieve a particular function. However, debugging these individual elements can be likened to finding a needle in a haystack. For example, structural software elements may rely on one or more foundational elements. In such circumstances, identifying whether the bug exists in the foundational or structural elements may be challenging to humans or computer algorithms. User interfaces could be improved to help a user visualize a structure of a computer program and to systematically interact with the program to discover bugs and other weaknesses in the program.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide example definitions.

A node (or data node): a data structure representation of a data item, such as an analysis item representing a particular analysis process, such as a particular set of software code, research hypothesis, conclusions, theories, etc. A node may be linked to one or more other nodes. In some embodiments, the link between two nodes can be directed. A node may include configuration data regarding the presentation of its underlying data set. In some embodiments, a node is immutable. However, in other embodiments, the data of a node may be modified. The terms "node," "data node," and "board" may be used interchangeably and/or synonymously in the present disclosure.

Two or more nodes in a data structure may be connected and/or linked. One example data structure is a tree data structure. In some embodiments, an example data structure has two or more parent nodes. In the context of a data structure: a "root node" is a top node in the structure; a "child node" and/or "sub-node" is a node that directly descends from a higher node; a "parent node" is the converse of a child; a child node has a "dependency" on a parent node; and a "descendent" is a node reachable by traversing from parent to child. A parent node may have one or more children. In some embodiments, an example data structure is a directed structure and/or a directed acyclic structure. As described herein, the data structure can be visually represented in a user interface as a workflow. Further, the example data structure can include data representing user interactions with the user interfaces and/or the data sets of the user interfaces.

Board: a user interface element associated with one or more nodes. In certain embodiments discussed herein, boards are illustrated as generally rectangular user interface elements. However, boards may be visualized in any other way, such as different shapes (e.g., circles, rows, columns, formatted text, etc.), colors, graphics, etc.

Reliability: an indication of trust or accuracy of an analysis item(s). Reliability levels or scores may be based on subjective information (e.g., ratings from scientific researchers) and/or objective information (e.g., automated analysis to determine consistency of information in the analysis item). A reliability score for an analysis item may be determined based on reliability scores (and/or other information regarding) one or more related analysis items.

Example Implementations

The systems and methods described herein provide highly dynamic and interactive data analysis user interfaces which enable the data analyst to quickly and efficiently explore large volume data sources. In particular, a data analysis system, such as described herein, may provide features to enable the data analyst to investigate large volumes of data over many different paths of analysis while maintaining detailed and retraceable steps taken by the data analyst over the course of an investigation, as captured via the data analyst's queries and user interaction with the user interfaces provided by the data analysis system. For example, one data analysis path may begin with a high volume data set, such as Internet proxy data, which may include hundreds or thousands (or more) of rows of elements of a process (e.g., scientific hypotheses, software code modules, etc.). Rather than start over from scratch, an analyst may wish to investigate a particular node or element of the process.

Various data storage mechanisms and associated user interfaces discussed herein address the functionality issues noted above. For example, a user interface can implement a board-based map of discretized logical flows of various processes, such as scientific knowledge or computer software. In a first aspect, the user interface can provide an interactive visualization of various components of scientific understanding that can allow a user to navigate various principles within which a logical flow may exist and be displayed. For example, indicators of logical flow can aid a user in interacting with the board-based map. In a second aspect, the board-based map can identify logical flows of a computer algorithm to aid a user in detecting and identifying a bug in algorithm. The UI can display a plurality of interactive boards in an ordered configuration, such as a grid. The UI can indicate logical flow from one board to another board. Boards may be collapsed from multiple boards into a single board, with at least some of the underlying data or metadata associated with the collapsed boards (e.g., trust levels) combined into the single remaining board. From a user interface perspective, this allows a user to "zoom out" of the board-based map. Additionally or alternatively, boards may be expanded to allow a user to drill down into a particular logical element (e.g., to access lower levels of abstraction). Boards may be forked to indicate a plurality of boards that build off the board. Boards may be backed by data/logic associated with those boards, and may be accessed and shared with others. Trust levels may be associated with boards, indicating a general likelihood of reliability of the information on the board. These trust levels may be used to determine a composite trust level of boards that may be combined (either automatically by the system and/or manually by the user) and trust levels may be at least partially inherited from parent node(s) of a particular node.

In an embodiment, a main data analysis workflow user interface provided by the data analysis system provides the data analyst with a set of highly interactive data visualization tools with which the data analyst can explore sets of data. Data visualization tools provided by the data analysis system can include, for example, a data summary view; a time series view; an ability to link to one or more boards or even another dataset; and options to add, remove, or keep only selected boards from a data view.

Each of these data visualization tools may include rich UI controls which are configured to respond to user interaction and input in a manner that allows the non-technical user to quickly and intuitively traverse a logical sequence of a process (e.g., scientific, software, etc.).

The data analysis systems and methods described herein may also include various features for search optimization on the backend or server-side. For example, a query backend module may be configured to analyze user selections and interactions with the data set query results and associated data visualizations and, based on those selections and interactions, determine what data the user is actually interested in, and translate the query into an efficient or optimized search query string. For example, the user might produce a workflow or analysis path which involves linking or joining a first large data set to a second large data set, and then filtering the resulting linked data set. An optimized search query string may then be generated which applies the filter operation prior to the link or join operation, such that the resources required to perform the join operation would be greatly reduced (e.g., since the link or join operation would be performed on smaller data sets resulting from the filter being applied first).

Example User Interfaces

Figure 2:
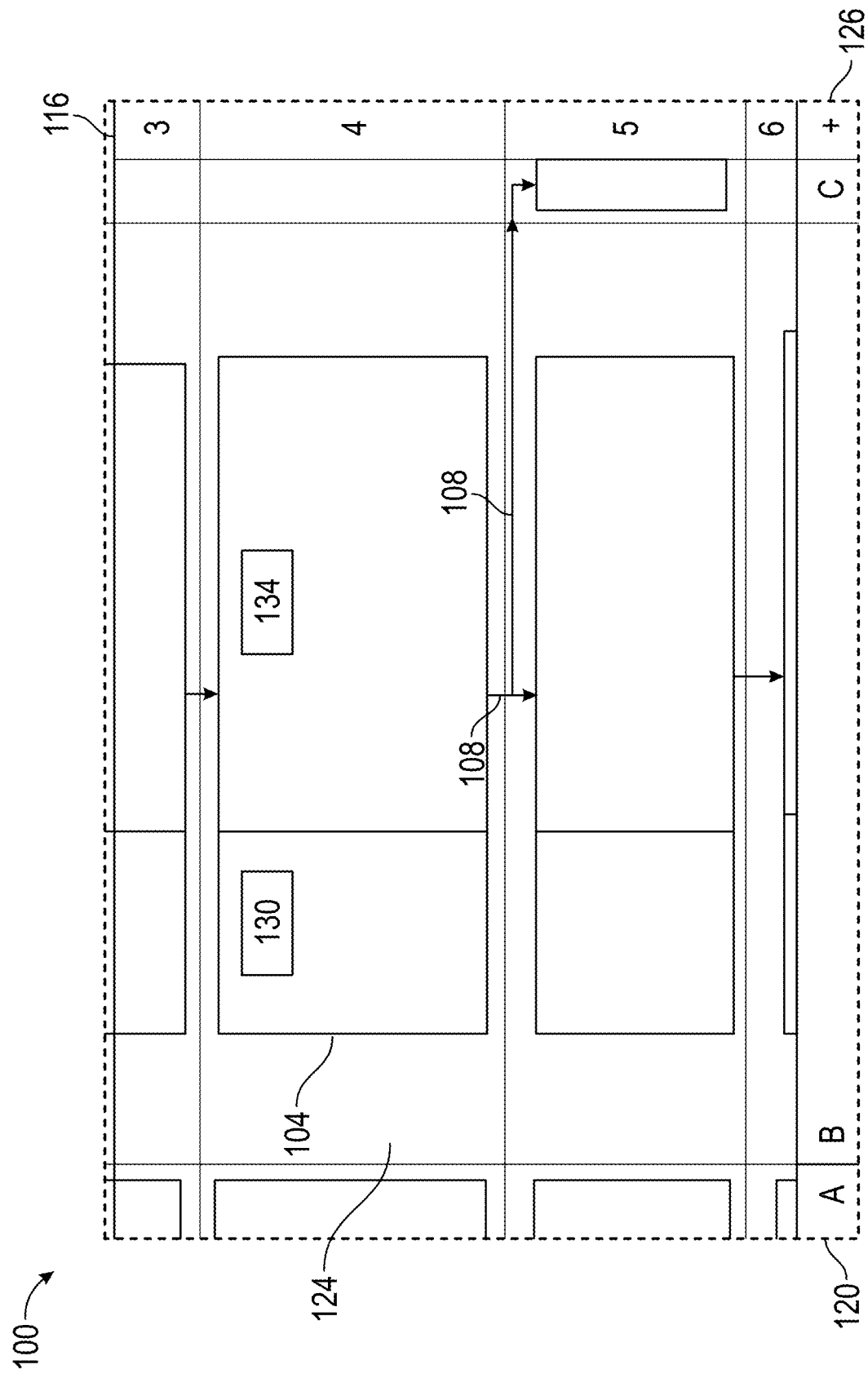
FIG. 2 shows a detail of a portion of an example interactive graphical user interface shown in FIG. 1.
Figure 3:
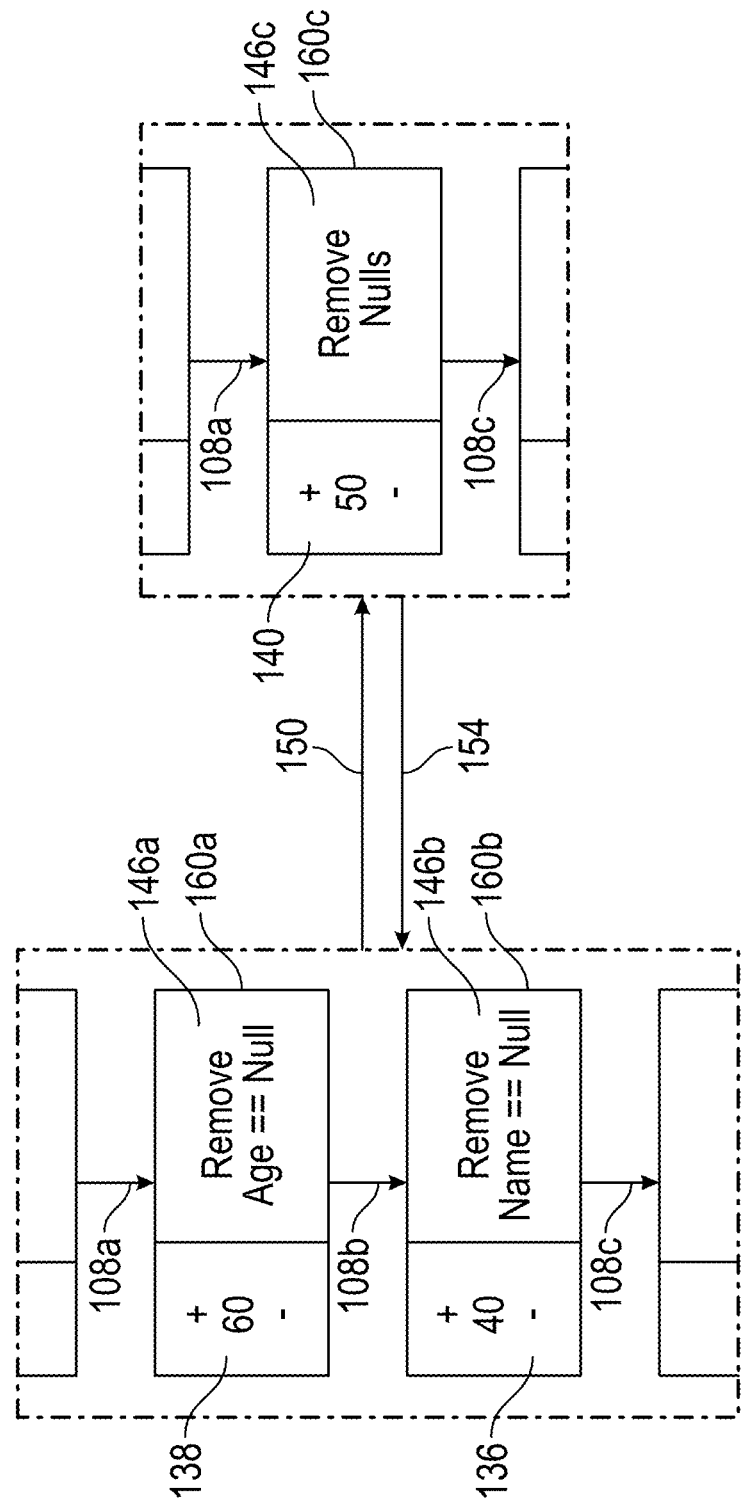
FIG. 3 is a flow diagram illustrating how a first group of boards may transition to a second group of boards and/or vice versa.

FIGS. 1-3 illustrate example user interfaces and UI components, as used in one or more embodiments of an interactive graphical user interface 100. The sample user interfaces may be displayed, for example, via a web browser (e.g., as a web page), a mobile application, or a standalone application. In some embodiments, the sample user interfaces shown may also be displayed on any suitable computer device, such as a cell/smart phone, tablet, wearable computing device, portable/mobile computing device, desktop, laptop, or personal computer, and are not limited to the samples as described herein. The user interfaces include examples of only certain features that a data analysis system may provide. In other embodiments, additional features may be provided, and they may be provided using various different user interfaces and software code. Depending on the embodiment, the user interfaces and functionality described with reference to FIGS. 1-3 may be provided by software executing on the individual's computing device, by a data analysis system located remotely that is in communication with the computing device via one or more networks, and/or some combination of software executing on the computing device and the data analysis system. In other embodiments, analogous interfaces may be presented using audio or other forms of communication. In an embodiment, the interfaces shown are configured to be interactive and respond to various user interactions. Such user interactions may include clicks with a mouse, typing with a keyboard, touches and/or gestures on a touch screen, voice commands, physical gestures made within a proximity of a user interface, and/or the like.

Figure 6:
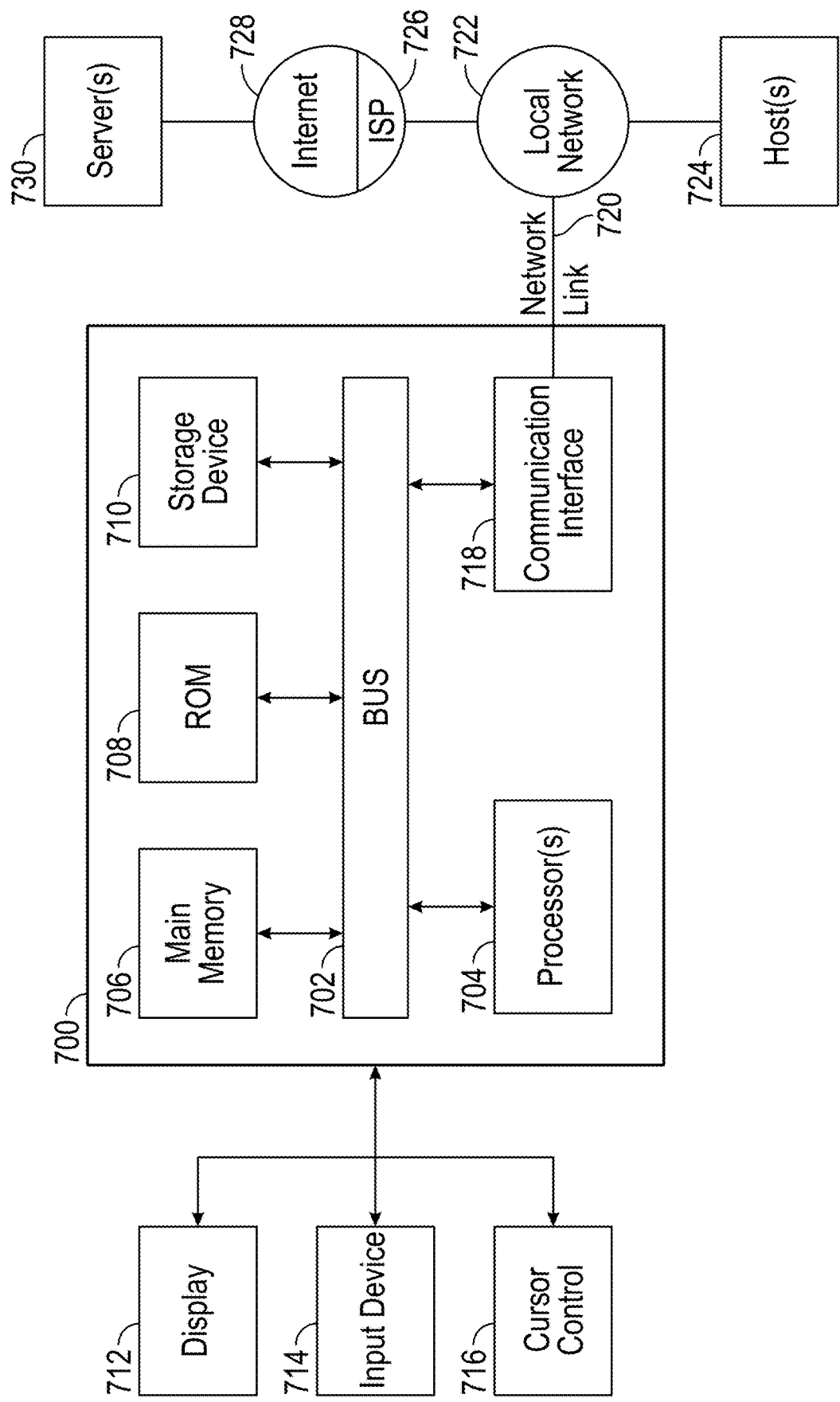
FIG. 6 is a block diagram illustrating one example of a computer system upon which various embodiments may be implemented.

FIG. 1 illustrates an example interactive graphical user interface 100, as generated using one embodiment of the display 712 of FIG. 6. As shown, the interactive graphical user interface 100 can be referred to as a board interface or other interface. The interactive graphical user interface 100 can include a plurality of boards 104. The boards 104 may be arranged in a particular order, which may be set by the software provider and/or customized by the user. For example, the boards 104 may be arranged on the display in a linear fashion, in a grid (e.g., as shown in FIG. 1), or in some other layout. The boards 104 can be arranged in one or more logical paths. One or more relationship indicators 108 can be displayed to show the logical relationship(s) between or among the boards 104.

A board 104 can represent a node in a logical structure. Multiple nodes can be linked via a common or related trait (such as by an edge in a data structure). The trait may be based on time (e.g., in a temporal relationship, a sequence, etc.), gradation, space, or other characteristic. Each board 104 can represent a discrete element of an intellectual (e.g., scientific, philosophical, historical, etc.) argument or other system, a software module or feature, a process flow, or other node tree or other node linking scheme. For embodiments where each board represents a scientific element, a board can include information related to the scientific element. For example, an intellectual system or argument may be based on a plurality of assertions or hypotheses. The assertions can be discretized and associated with corresponding boards 104 (and underlying data stored in nodes). Links between or among the boards 104 can be represented by the relationship indicators 108. Each relationship indicator 108 can be directional (e.g., an arrow) or connectional (e.g., a line).

In some embodiments, the boards 104 can be displayed in a vertical arrangement as shown in FIG. 1. The boards 104 can be arranged in a logical order, such as in a board arrangement 112. For example, a parent board 104a and one or more child boards 104b can indicate stages of a process, such as ordered elements of a software program or research events that build upon one another. In some embodiments, the boards are arranged in a chronological or other temporal relationship. For embodiments with directional relationship indicators 108, the relationship indicator 108 can point from a parent board 104a to a child board 104b. The boards 104 can be located in the interactive graphical user interface 100 in corresponding grid locations 124. Each grid location 124 can be associated with a corresponding row and column. The row indicators 116 and column indicators 120 can allow a user to more intuitively interact with the boards 104. For example, the row indicators 116 and the column indicators 120 may provide a grid system that allows a user to easily reference one or more boards. The grid system may allow for compact relay of information, e.g., through a link, reference, or pointer.

Each board 104 can include information regarding the data item(s) associated with the board, such as a summary, table, histogram, distribution, time series, grid, heatmap, pivot table, filter, column editor, enrich, link, set math, export, and/or chart visualization. Additional details on some of these information indicators and some of the functionality of these information indicators can be found in U.S. Patent Application Publication No. 2018/0039399, titled "INTERACTIVE USER INTERFACE FOR DYNAMICALLY UPDATING DATA AND DATA ANALYSIS AND QUERY PROCESSING," filed on Oct. 13, 2017, which is incorporated by reference herein in its entirety for all purposes.

FIG. 2 shows a detail of a portion of an example interactive graphical user interface 100 shown in FIG. 1. As shown, in some embodiments one or more of the boards 104 can include a score region 130 and an attribute region 134. The score region 130 can include a reliability score, such as a trust or accuracy score. The attributes region 134 can include an information indicator, such as those described herein. The reliability score can be associated with one or more corresponding boards 104. A reliability score may be determined at least in part by a process associated with the associated board 104 or node. For example, the reliability score may be associated with the discretized intellectual element associated with the board 104, such as a scientific theory or a philosophical assertion. One or more of the reliability scores may be determined at least in part by a user input. For example, the score region 130 may include a score modifier selector to allow a user increase (e.g., a "plus" sign) and/or decrease (e.g., a "minus" sign) the reliability score, which may then be automatically update a corresponding reliability indicator that may be shared with other users. In this manner, the reliability scores may be "crowd sourced" to include reliability indicators from multiple individuals, entities, and/or automated processes. Other variations are possible.

In some embodiments, the reliability scores of one or more children nodes 104*b* may be at least partially based on reliability scores of one or more related nodes, such as one or more parent nodes 104*a*. Reliability scores may be combined based on various aspects of related nodes, such as by selecting a lowest score of all predecessor nodes, a highest score of all predecessor nodes, or applying an algorithmic model to data associated with the predecessors nodes (e.g., reliability scores of predecessors nodes may be weighted based on sources of the underlying analysis item, sources of the reliability scores for that node, etc.). A predecessor node can include parent nodes, parent nodes of the parent nodes, and so forth. By contrast, leaf, descendent, progenitor, or ancestor nodes may refer to child nodes or child nodes of the child nodes, and so forth. In some embodiments, a reliability score of a particular board 104 is equal to the lowest score of all of the predecessor nodes. This may be helpful in identifying a node in which the trust or reliability score drops. For example, if nodes or boards 104 represent elements or modules of software code in a software application, a user seeking to debug the code may quickly identify a module in which the trust score of subsequent or child nodes begins to drop. Thus, a debugger can quickly identify the node or board that may require further investigation or debugging. In some embodiments, the reliability scores may include a mathematical averaging of all or some predecessor nodes. In this way, the reliability scores of later nodes can raise the reliability of later nodes or boards and indicate a trend of rising trust in spite of a previous low-trust node or board.

The attributes region 134 can provide valuable information related to the corresponding board 104 or node. The attributes region 134 can include a description of the attribute of the board 104. For example, in embodiments where each board 104 represents an element or module of computer software, the attributes region 134 can include a portion of computer code, such as "age==null" or "name==null". In some embodiments, a link or pointer (e.g., a clickable hyperlink) may be included in the attributes region 134. A selection of the link, for example, may update the interactive graphical user interface 100 to display the node or further content associated with the selected node. This linking functionality may apply to links within the boards 104 and/or links external to the boards 104. For example, a link may be included in external document (e.g., online articles, websites, etc.), where the link includes a reference to a dataset associated with the boards 104 of the interactive graphical user interface 100. For example, a link may be associated with a particular board (e.g., at a particular location, such as a row/column, or a dataset) so that when selected by a user (via an external or internal file or document), the user's browser (or other application wherein the link is selected) is directed to the interactive graphical user interface 100 to show the linked board 104 (and/or content associated with the board 104). In some embodiments, selection of such a link initiates display of the linked board within or near an article or other document that includes the link. Additionally or alternatively, the link may be from within the dataset of the boards 104 (e.g., within a attributes region 134 of one of the boards 104). In some embodiments, a marketplace can be created for trading, selling, sharing, and/or modifying individual and/or groups of boards belonging to another person or institution. For example, research institutions that each conduct scientific research may be interested in sharing individual or groups of boards to review (e.g., peer review) that individual or group of boards. Thus, the interactive graphical user interface 100 may allow distinct groups of people and/or institutions from reviewing and/or modifying the same board(s). As a different example, one individual or group could create a piece or module of a computer software application (e.g., a specific process of a piece of medical device hardware) that could be traded and/or sold through a marketplace.

In response to a selection of the link (e.g., internal link, external link), the interactive graphical user interface 100 can display information associated with the link that may be located in a database external to a database associated with the boards 104. The external information can include information external to the dataset. For example, a link to a webpage, a document, an email, a video, a photo, a graph, a dataset, or any other type of information may be displayed in the interactive graphical user interface 100 in response to the link selection. A new window may appear overlaid on the board arrangement 112. The information may be displayed in a window dedicated to a display of the information. Additional space for boards 104 in the board arrangement 112 may be made by use of a grid expander selector 126.

FIG. 3 shows a way that a first group of boards 104 may transition to a second group of boards 104 and/or vice versa. A first group of boards 104 may include a first board 160*a* and a second board 160*b*. One or more relationship indicators 108*a-c* may show a parent-child (or some other logical flow) relationship among the first and second boards 160*a*, 160*b*. Each board 160*a*, 160*b* may include a corresponding score indicator 138 and score modifier selectors 136. Corresponding board attributes 146*a*, 146*b* may also be included.

A user may make a collapsing transition 150 and/or an expanding transition 154 based on a selection. In contrast to the zooming in and out shown in FIG. 3, which is essentially a view operation, the transitions illustrated in FIG. 3 actually collapse multiple boards into fewer boards (e.g., one board), and/or a expand a board into a larger group of boards. For example, in some embodiments, in response to a collapsing transition 150, a resulting third board attribute 146*c* may include information related to one or both of the board attributes 146*a*, 146*b*. In this way, the system may allow a user to quickly identify common functionality (e.g., common software operations) in a single board or small group of boards. The information related to the board attributes 146*a*, 146*b* may include a determination of a commonality between the first board attributes 146*a* and the second board attributes 146*b*. For example, the third board attributes 146*c* may include a combination of the board attributes 146*a*, 146*b*. As shown, the first board attributes 146*a* includes a criterion or rule of "age==null" and the second board attributes 146*b* includes a "name==null" criterion. The symbol "==" may indicate, for example, that a first item "is defined by" the second item. The resulting third board attributes 146*c* may include a command that is a combination of the two criteria (e.g., a "remove nulls" command).

Other variants are possible. Additionally or alternatively, the second relationship indicators 108b may be omitted or subsumed within (but need not be necessarily be displayed) within the third board 160c. In this way, the interactive graphical user interface 100 may allow the collapsing transition 150 to appear as if the user is zooming out of the first group of boards. The second group of boards in this scenario would be the resulting collapsed version of the first group of boards. An analogous, but contrasted, transition can characterize one or more attributes of the expanding transition 154. One or both of the transitions 150, 154 may be controlled through a user input (e.g., a scrolling action, etc.).

Figure 4:
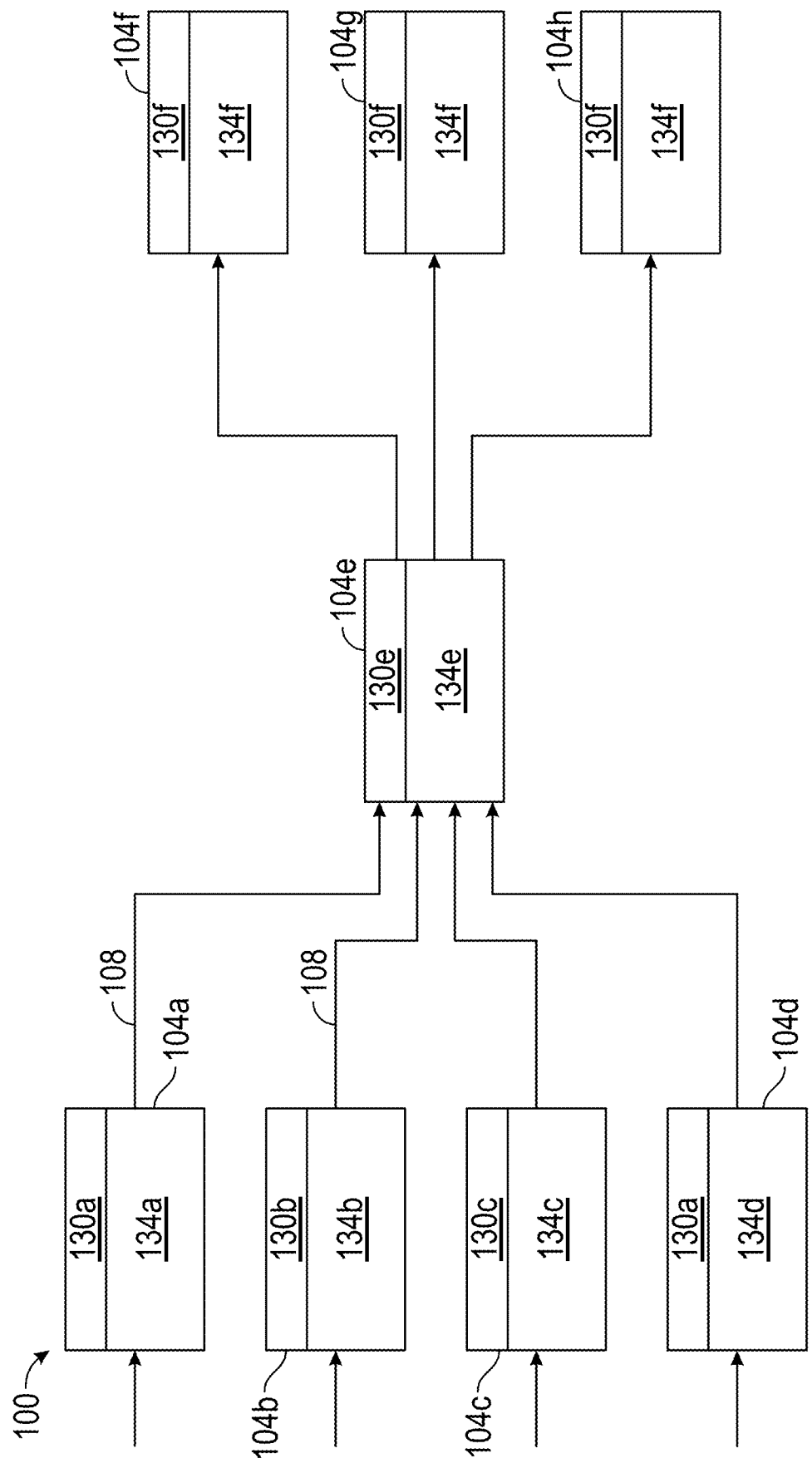
FIG. 4 shows another embodiment of a possible interactive graphical user interface.

Another embodiment of a possible interactive graphical user interface 100 is shown in FIG. 4. A plurality of boards 104a-d may be visually "collapsed" (without a corresponding collapsing transition 150) via one or more relationship indicators 108. This may be indicated where a plurality of boards 104 have fewer children boards than the plurality of boards 104. For example, the boards 104a-d have a single child board 104e. Thus, the interactive graphical user interface 100 may indicate a zoomed-out relationship of 104e relative to the boards 104a-d. Analogous zoom-in functionality can be portrayed where a plurality of children nodes stem from fewer parent nodes. For example, the children boards (or nodes) 104f-h may have a common parent board 104e. Thus, the interactive graphical user interface 100 can show simultaneous zoom-in and/or zoom-out functionality within the same display without a time-based collapsing transition 150 and/or expanding transition 154.

Figure 5:
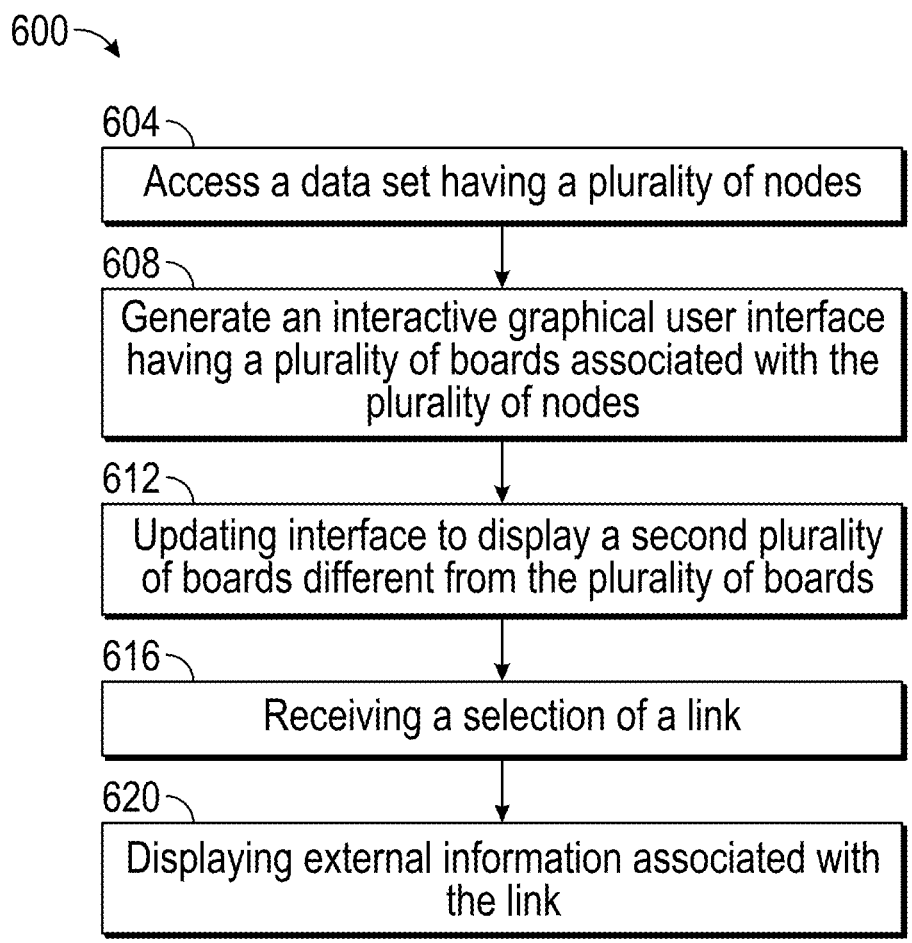
FIG. 5 is a flowchart illustrating an example embodiment of a method that may be implemented.

FIG. 5 shows an example embodiment of a method 600 that may be implemented to provide certain features discussed herein, such as by the computing system 700 (FIG. 6), a user computing device, and/or other computing devices. Depending on the embodiment, the process may include further or additional blocks and/or the blocks may be performed in an order different than is illustrated.

At block 604, the method 600 can include accessing a data set having a plurality of nodes. The block 604 may be associated with corresponding boards for display on an interactive graphical user interface. At block 608 the interactive graphical user interface can be generated having the plurality of boards that are associated with the corresponding nodes. The boards may be arranged in any fashion or order described herein. At block 612 the method can include updating the user interface to display a second plurality of boards different from the plurality of boards. For example, a collapsing or expanding transition may be executed (e.g., via a user command), such as one described herein, which may include a determination of a reliability score based on information associated with one or more other boards. In some embodiments, at block 616 the method 600 receives a selection of a link. The link may be a link or pointer described herein, such as a link pointing to content internal to a database associated with the plurality of boards or external thereto. The link may be stored and/or located in a location and/or database external to that associated with the plurality of boards. For example, the link may be accessed from a location through a network, such as an Internet or intranet. At block 620, the method can display information (e.g., information external to the plurality of boards) associated with the link. The information may correspond to text, a graph, chart, flowchart, heatmap, or any other type of content described herein.

Other Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the programming notebook system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. For example, a general purpose computer comprising one or more processors should not be interpreted as excluding other computer components, and may possibly include such components as memory, input/output devices, and/or network interfaces, among others. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

Example Embodiments

In a 1st example, a computerized method comprises: accessing a data set comprising: a plurality of nodes associated with portions of a process; indications of logical relationships between nodes, including at least some relationships between nodes; a first subset of nodes associated with a first portion of the process; node identifiers associated with particular nodes, the node identifiers usable to select particular nodes; and reliability scores associated with particular nodes, wherein reliability scores of children nodes are at least partially based on reliability scores of one or more parent nodes; generating an interactive graphical user interface comprising a plurality of boards associated with at least some of the plurality of nodes, excluding at least some of the nodes of the first subset of nodes.

In a 2nd example, the method of example 1, wherein the user interface comprises at least one indicator of logical relationship between two boards, the at least one indicator of logical relationship corresponding to an indication of logical relationships between nodes corresponding to the two boards.

In a 3rd example, the method of any of examples 1-2, further comprising updating the interactive graphical user interface to display a second plurality of boards different from the plurality of boards.

In a 4th example, the method of any of examples 1-3, comprising updating, based on a collapse input, the interactive graphical user interface to display a second plurality of boards greater than the plurality of boards.

In a 5th example, the method of example 4, wherein updating the interactive graphical user interface to display a second plurality of boards greater than the plurality of boards comprises displaying an indication that a first board of the plurality of boards split into at least two boards.

In a 6th example, the method of example 5, wherein updating the interactive graphical user interface to display a second plurality of boards greater than the plurality of boards comprises displaying a first indication of logical flow between at least one of the at least two boards and another board.

In a 7th example, the method of any of examples 1-6, comprising updating, based on an expand input, the interactive graphical user interface to display a second plurality of boards fewer than the plurality of boards.

In an 8th example, the method of example 7, wherein updating the interactive graphical user interface to display a second plurality of boards fewer than the plurality of boards comprises displaying an indication that at least two boards of the plurality of boards combined into a combined board.

In a 9th example, the method of example 8, wherein updating the interactive graphical user interface to display a second plurality of boards greater than the plurality of boards comprises displaying a second indication of logical flow between the combined board and another board.

In a 10th example, the method of any of examples 1-9, wherein at least one of the reliability scores is determined at least in part by a process associated with the associated node.

In an 11th example, the method of any of examples 1-10, wherein at least one of the reliability scores is determined at least in part by a user input.

In a 12th example, the method of any of examples 1-11, wherein at least one of the reliability scores comprises a lowest score of all predecessor nodes.

In a 13th example, the method of any of examples 1-12, wherein at least one of the reliability scores comprises a mathematical averaging of all predecessor nodes.

In a 14th example, the method of any of examples 1-13, wherein the plurality of boards is displayed in a grid comprising rows and columns.

In a 15th example, the method of any of examples 1-14, wherein generating the interactive graphical user interface further comprises displaying, based on a selection of a link to a node location of a first node, a first board associated with the first node, the link selectable from a location external to the dataset.

In a 16th example, the method of any of examples 1-15, wherein generating the interactive graphical user interface further comprises displaying, based on a selection of a link to a node location of a second node, a second board associated with the second node, the link selectable from a location within the dataset.

In a 17th example, the method of any of examples 1-16, wherein generating the interactive graphical user interface further comprises displaying, based on a selection of a link, external information associated with the link, at least a portion of the external information, the external information comprising information external to the dataset.

In an 18th example, the method of any of examples 1-17, wherein generating the interactive graphical user interface further comprises updating, based on a user update action, the plurality of boards to include at least one new board different from any of the plurality of boards.

In a 19th example, the method of any of examples 1-18, further wherein generating the interactive graphical user interface further comprises displaying the plurality of boards without at least a portion of code of the process associated with the corresponding node.

In a 20th example, a computerized method comprises: generating data for rendering an interactive graphical user interface, the interactive graphical user interface comprising: a plurality of boards comprising a first plurality of boards and a second plurality of boards; and a first indicator of logical flow indicating a link between first and second boards of the first plurality of boards; a second indicator of logical flow indicating a link between first and second boards of the second plurality of boards; receive a user modification input; in response to the user modification input, update the interactive graphical user interface to display one or more boards having a second plurality of boards different from the plurality of boards.

Additional Implementation Details

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 6 is a block diagram that illustrates a computer system 700 upon which various embodiments may be implemented. Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computerized method comprising:
   accessing a data set comprising:
   a plurality of nodes associated with portions of a process;
   indications of logical relationships between nodes, including at least some relationships between nodes;
   a first subset of nodes associated with a first portion of the process;
   node identifiers associated with particular nodes, the node identifiers usable to select particular nodes; and
   reliability scores associated with particular nodes, wherein reliability scores of children nodes are at least partially based on reliability scores of one or more parent nodes;
   generating an interactive graphical user interface comprising a plurality of boards associated with at least some of the plurality of nodes, excluding at least some of the nodes of the first subset of nodes, each of the plurality of boards comprising a score region and an attribute region, each of the plurality of boards comprising:
   a score modifier selector configured to allow a user to modify reliability scores associated with corresponding nodes; and
   a board attribute within the corresponding attribute region, the board attribute comprising a logical expression;
   updating, based on a collapse input, the interactive graphical user interface to display a second plurality of boards fewer than the plurality of boards;
   displaying an indication that at least two boards of the plurality of boards combined into a combined board, a first board of the at least two boards having a first reliability score and a first board attribute, and a second board of the at least two boards having a second reliability score and a second board attribute;
   determining, based on the collapse input, a combined reliability score, based on the first and second reliability scores;
   determining, based on the collapse input, a combined board attribute, based on the first and second board attributes, the combined board attribute comprising a combined logical expression based on the first and second board attribute logical expressions; and
   displaying the combined reliability score within a score region of the combined board and the combined logical expression within the attribute region of the combined board.

2. The method of claim 1, wherein the user interface comprises at least one indicator of logical relationship between two boards, the at least one indicator of logical relationship corresponding to an indication of logical relationships between nodes corresponding to the two boards.

3. The method of claim 1, further comprising updating the interactive graphical user interface to display a second plurality of boards different from the plurality of boards.

4. The method of claim 1, comprising updating, based on an expand input, the interactive graphical user interface to display a second plurality of boards greater than the plurality of boards.

5. The method of claim 4, wherein updating the interactive graphical user interface to display a second plurality of boards greater than the plurality of boards comprises displaying an indication that a first board of the plurality of boards split into at least two boards.

6. The method of claim 5, wherein updating the interactive graphical user interface to display a second plurality of boards greater than the plurality of boards comprises displaying a first indication of logical flow between at least one of the at least two boards and another board.

7. The method of claim 1, wherein updating the interactive graphical user interface to display a second plurality of boards fewer than the plurality of boards comprises displaying a second indication of logical flow between the combined board and another board.

8. The method of claim 1, wherein at least one of the reliability scores is determined at least in part by a process associated with the associated node.

9. The method of claim 1, wherein at least one of the reliability scores is determined at least in part by a user input.

10. The method of claim 1, wherein at least one of the reliability scores comprises a lowest reliability score of all predecessor nodes.

11. The method of claim 1, wherein at least one of the reliability scores comprises a mathematical averaging of all predecessor nodes.

12. The method of claim 1, wherein the plurality of boards is displayed in a grid comprising rows and columns.

13. The method of claim 1, wherein generating the interactive graphical user interface further comprises displaying, based on a selection of a link to a node location of a first node, a first board associated with the first node, the link selectable from a location external to the dataset.

14. The method of claim 1, wherein generating the interactive graphical user interface further comprises displaying, based on a selection of a link to a node location of a second node, a second board associated with the second node, the link selectable from a location within the dataset.

15. The method of claim 1, wherein generating the interactive graphical user interface further comprises displaying, based on a selection of a link, external information associated with the link, at least a portion of the external information, the external information comprising information external to the dataset.

16. The method of claim 1, wherein generating the interactive graphical user interface further comprises updating, based on a user update action, the plurality of boards to include at least one new board different from any of the plurality of boards.

17. The method of claim 1, further wherein generating the interactive graphical user interface further comprises displaying the plurality of boards without at least a portion of code of the process associated with the corresponding node.

18. The method of claim 1, further comprising: updating, in response to a collapse input, the interactive graphical user interface to display an updated plurality of boards comprising a board having an attribute region that is based on respective attribute regions of at least two boards of the plurality of boards.

19. The method of claim 1, further comprising: displaying a combined attribute in relation to the combined board, the combined attribute based at least on first and second attributes displayed within corresponding attribute regions of respective first and second boards of the at least two boards of the plurality of boards.

20. A computerized method comprising:
generating data for rendering an interactive graphical user interface, the interactive graphical user interface comprising:
    a plurality of boards comprising a first plurality of boards and a second plurality of boards, each of the boards of the first and second pluralities of boards comprising respective score regions and respective attribute regions; and
    a first indicator of logical flow indicating a link between first and second boards of the first plurality of boards; and
    a second indicator of logical flow indicating a link between first and second boards of the second plurality of boards;
receiving a user modification input comprising a collapse input;
in response to the user modification input, updating the interactive graphical user interface to display one or more boards, the one or more boards comprising a quantity of boards fewer from a quantity of the plurality of boards, each of the plurality of boards comprising:
    a score modifier selector configured to allow a user to modify reliability scores associated with corresponding nodes, wherein the one or more boards comprise a combined board; and
    a board attribute within the corresponding attribute region, the board attribute comprising a logical expression;
displaying an indication that at least two boards of the plurality of boards combined into the combined board, a first board of the at least two boards having a first reliability score and a first board attribute, and a second board of the at least two boards having a second reliability score and a second board attribute;
determining, based on the collapse input, a combined reliability score, based on the first and second reliability scores;
determining, based on the collapse input, a combined board attribute, based on the first and second board attributes, the combined board attribute comprising a combined logical expression based on the first and second board attribute logical expressions; and
displaying the combined reliability score within a score region of the combined board.

* * * * *